United States Patent
Fujiwara et al.

(10) Patent No.: US 8,049,846 B2
(45) Date of Patent: Nov. 1, 2011

(54) REFLECTION-TYPE DISPLAY DEVICE AND METHOD FOR PRODUCING THE SAME

(75) Inventors: Sayuri Fujiwara, Nara (JP); Kiyoshi Minoura, Nara (JP); Makoto Kanbe, Sakurai (JP); Yutaka Sawayama, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 994 days.

(21) Appl. No.: 11/366,463

(22) Filed: Mar. 3, 2006

(65) Prior Publication Data

US 2006/0197892 A1 Sep. 7, 2006

(30) Foreign Application Priority Data

Mar. 4, 2005 (JP) .................... 2005-060493

(51) Int. Cl.
*G02F 1/1335* (2006.01)

(52) U.S. Cl. .................... 349/113; 359/529; 359/530

(58) Field of Classification Search .............. 349/113, 349/114, 146; 359/529, 530, 247
See application file for complete search history.

(56) References Cited

U.S. PATENT DOCUMENTS

| | | | | |
|---|---|---|---|---|
| 4,744,639 A * | 5/1988 | Tsuboyama | .................... | 349/122 |
| 6,657,766 B2 | 12/2003 | Minoura et al. | | |
| 6,788,366 B2 | 9/2004 | Sawayama et al. | | |
| 6,788,372 B1 * | 9/2004 | Kaise et al. | .................... | 349/122 |
| 7,475,997 B2 * | 1/2009 | Fujiwara et al. | .................... | 359/529 |
| 2001/0040717 A1 * | 11/2001 | Minoura et al. | .................... | 359/263 |
| 2003/0053015 A1 * | 3/2003 | Minoura et al. | .................... | 349/113 |
| 2003/0117554 A1 * | 6/2003 | Sawayama et al. | .................... | 349/113 |
| 2003/0124849 A1 | 7/2003 | Ihara et al. | | |
| 2005/0128386 A1 * | 6/2005 | Nakayoshi et al. | .................... | 349/113 |

FOREIGN PATENT DOCUMENTS

| | | |
|---|---|---|
| JP | 2002-55359 | 2/2002 |
| JP | 2004-37523 | 2/2004 |

* cited by examiner

*Primary Examiner* — Thanh-Nhan Nguyen
(74) *Attorney, Agent, or Firm* — Nixon & Vanderhye P.C.

(57) ABSTRACT

A reflection-type display device includes an optical modulation layer 34, a pair of substrates 30 and 32 between which the optical modulation layer 34 is retained, an electrode structure 52, 44 for causing pixel-by-pixel changes in the optical characteristics of the optical modulation layer 34. One of the pair of substrates 32 has a corner cube array composed of a plurality of corner cubes 36. The corner cube array 36 has a plurality of projections 46 defining an interval between the pair of substrates 30 and 32, the plurality of projections 46 being disposed in peak portions.

18 Claims, 12 Drawing Sheets

○ PEAK POINT
● BOTTOM POINT
△ SADDLE POINT

○ PEAK POINT
● BOTTOM POINT

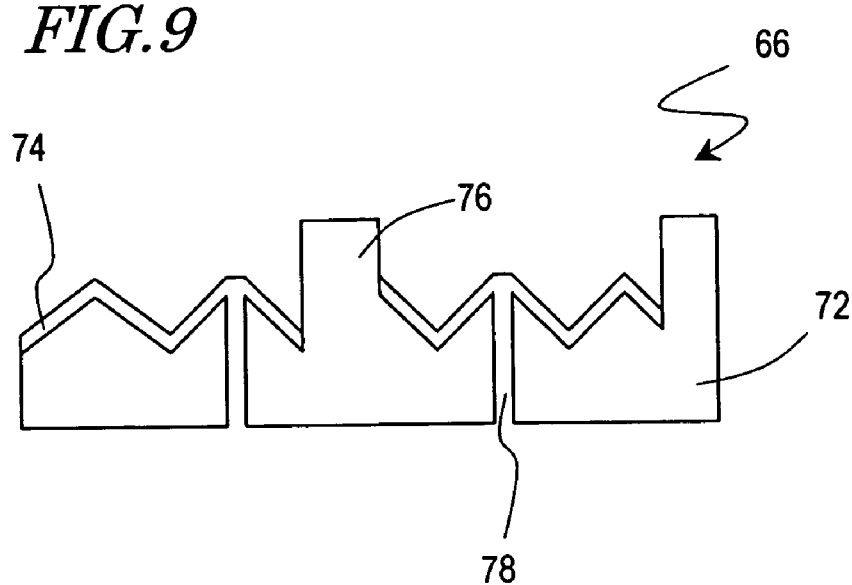
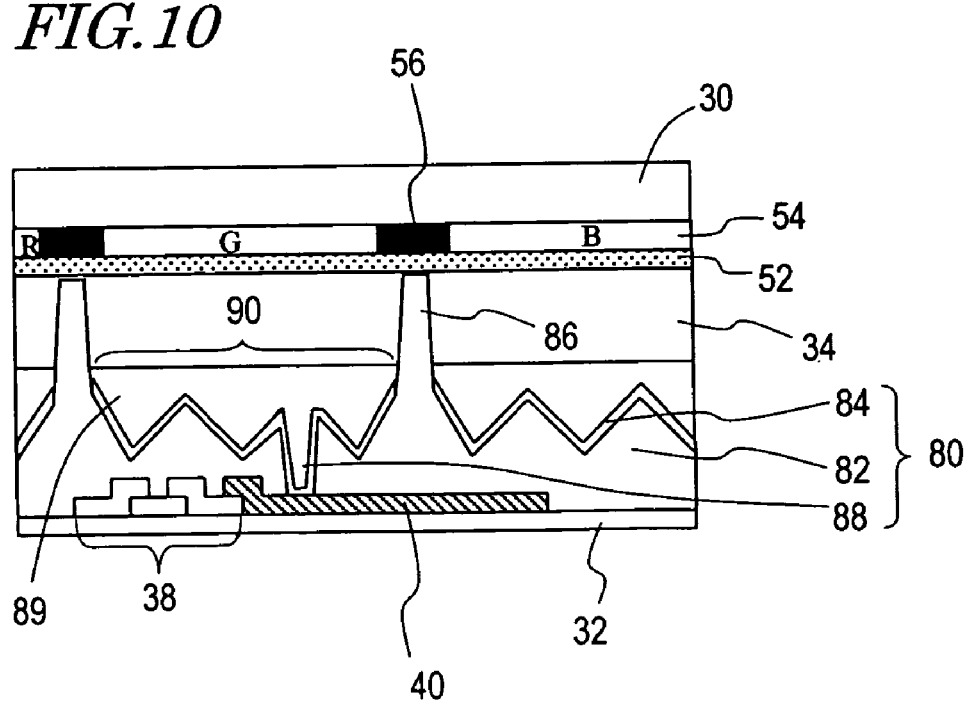

O : PEAK POINT
● : BOTTOM POINT

O : PEAK POINT
● : BOTTOM POINT

REFLECTION-TYPE DISPLAY DEVICE AND METHOD FOR PRODUCING THE SAME

BACKGROUND OF THE INVENTION

1. Field of the Invention

The present invention relates to a reflection-type display device and a method for producing the same.

2. Description of the Related Art

Liquid crystal display devices (hereinafter "LCDs") of a reflection type, which perform display by utilizing ambient light as a light source, have been known. Since reflection-type LCDs do not require a backlight as do transmission-type LCDs, reflection-type LCDs are suitably used for various devices which must have a light weight and a thin thickness. In particular, reflection-type LCDs of an active matrix driving type, in which a switching element is provided corresponding to each pixel, are capable of performing display with a high resolution and high quality.

In a reflection-type LCD, ambient light which enters a liquid crystal layer is modulated in the liquid crystal layer, and thereafter reflected by a reflective layer so as to be utilized for displaying. Use of a retroreflection plate having retroreflection characteristics as such a reflective layer has been proposed (see, for example, Japanese Laid-Open Patent Publication Nos. 2003-195788 and 2002-107519, both of which have been filed by the Applicant). As used herein, a "retroreflection plate" is a device which reflects an incoming ray of light with a plurality of reflection surfaces, regardless of the orientation of the ray, in the direction in which the ray entered the device. For example, a retroreflection plate is composed of a two-dimensional array of minute unit features.

Reflection-type LCDs which employ a retroreflection plate as a reflective layer ("retroreflection-type LCDs") do not require any polarizing plates, and hence there is no decrease in the efficiency of light utilization associated with the use of polarizing plates. Thus, retroreflection-type LCDs can perform brighter display. Moreover, retroreflection-type LCDs are considered as promising because of their potential ability to realize an improved display contrast ratio.

Hereinafter, the structure of a retroreflection-type LCD of an active matrix driving type will be described with reference to the accompanying drawings. FIG. 1A is a schematic cross-sectional view showing a retroreflection-type LCD. FIG. 1B is a plan view showing reflection electrodes in the display device of FIG. 1A. A structure as shown in FIGS. 1A and 1B is disclosed in, for example, Japanese Laid-Open Patent Publication No. 2003-195788 filed by the Applicant.

As shown in FIG. 1A, the retroreflection-type LCD comprises: a front substrate 110 on which color filters 119, a transparent counter electrode 111, and an alignment film 112 are provided; a rear substrate 109 provided so as to oppose the front substrate 110; and a liquid crystal layer 113 interposed between the substrates 110 and 109. The rear substrate 109 includes: a TFT substrate 101 having a plurality of switching elements (TFTs), a retroreflective layer 106, and an alignment layer 118. The retroreflective layer 106 includes an insulating layer 102 which has a surface configuration that exhibits a retroreflection property; and a reflective metal layer 105 which is formed on the insulating layer 102 and presents an uneven surface corresponding to the surface configuration of the insulating layer 102. As shown in FIG. 1B, the reflective metal layer 105 consists of a plurality of reflection electrodes which are formed so as to be spaced apart from one another, corresponding to pixels (which define units of image displaying). Each reflection electrode is connected to a drain electrode 103 of a corresponding switching element on the TFT substrate 101, via a contact hole 104 which is formed in the insulating layer 102. The alignment layer 118, which is formed above the retroreflective layer 106, has protrusions and depressions corresponding to the surface configuration of the insulating layer 102. The liquid crystal layer 113 may be composed of, for example, a scattering type liquid crystal material which is capable of switching between a light transmitting state and a light scattering state (forward scattering) in accordance with a varying voltage which is applied between the counter electrode 111 and each reflection electrode 105. Although not shown in FIG. 1A, structures (called "spacers") for controlling the interval between the substrates 110 and 109 are provided between the two substrates 110 and 109.

In a display device of this structure, the retroreflective layer 106 functions not only as a retroreflective layer but also as pixel electrodes. Hereinafter, the operation of this display device will be described.

While the liquid crystal layer 113 is controlled to be in a transmitting state, light from a light source which lies external to the display device or ambient light is transmitted through the front substrate 110 and the liquid crystal layer 113, and thereafter reflected by the retroreflective layer 106 in the direction in which the light has entered. From the display device under this condition, an image of the eye(s) of the viewer himself or herself is perceived by the viewer, whereby a "black" displaying state is obtained.

On the other hand, while the liquid crystal layer 113 is controlled to be in a scattering state, the light from a light source or ambient light which has been transmitted through the front substrate 110 is scattered in the liquid crystal layer 113. In the case where the liquid crystal layer 113 is a forward scattering-type liquid crystal layer, the scattered light is reflected by the retroreflective layer 106, further travels through the liquid crystal layer 113 (which is in a scattering state), and goes out in the viewing direction. Since the retroreflection property of the retroreflective layer 106 is counteracted by the scattering in the liquid crystal layer 113, the incident light does not go back in its incident direction. As a result, a "white" displaying state is obtained.

By performing display based on such operation principles, it is possible to realize white/black displaying states without employing polarizers. Therefore, there is no decrease in the efficiency of light utilization associated with the use of polarizers, and a reflection-type LCD having a display with a high brightness can be realized.

In any display device based on the operation principles as illustrated in FIGS. 1A and 1B, in order to further improve the contrast ratio during display, it is important to increase the retroreflectance of the retroreflective layer to reduce the amount of unnecessary light which reaches the viewer in a black displaying state.

As one type of retroreflective layer having a high retroreflectance, corner cube arrays are known. A corner cube array is a two-dimensional array of corner cubes (CCs) each composed of three faces which are perpendicular to one another. FIGS. 2A and 2B are a plan view and a perspective view, respectively, of a corner cube array. In Japanese Laid-Open Patent Publication Nos. 2003-066211 and 2003-185817, both filed by the Applicant, it is proposed to produce an array of minute corner cubes (micro-corner cube array, hereinafter abbreviated as "MCCA"), by anisotropically etching a substrate which has a crystal structure, and utilize the MCCA as a retroreflective layer of a reflection-type LCD. In the present specification, the shortest distance $P_{cc}$ between peak points of corner cubes will be referred to as the "pitch" of corner cubes. For example, the pitch $P_{cc}$ of an MCCA is equal to or greater than the wavelength of visible light, and equal to or less than the width of each pixel in a reflection-type LCD.

In the display device as shown in FIGS. 1A and 1B, as described above, display is performed by applying a voltage across the liquid crystal layer 113 so as to change its optical characteristics. For example, in the case where a liquid crystal layer 113 of polymer dispersed liquid crystal (PDLC) is employed, the difference in refractive index between the polymer and the liquid crystal changes in accordance with a voltage applied across the liquid crystal layer 113, so that the degree of scattering in the liquid crystal layer 113 is varied, whereby gray-scale displaying is achieved. Therefore, the thickness of the liquid crystal layer 113 is an important parameter in controlling the displaying by such a display device.

The thickness of the liquid crystal layer 113 is defined by spacers which are provided between the rear substrate 109 (on which the retroreflective layer 106 is provided) and the front substrate 110. Hereinafter, a method which is commonly used for forming spacers in an LCD will be described.

As a method for forming spacers, a method of scattering spacers of a predetermined particle size on either one of the front and rear substrates (spacer scattering method) has conventionally been employed. However, with a spacer scattering method, spacers are randomly disposed on the substrate surface, and it is impossible to dispose spacers in any specific positions on the substrate surface. Therefore, random disorientations in liquid crystal may be caused by the spacers, resulting in improper display.

Therefore, instead of a spacer scattering method, a method which uses photolithography to form columnar spacers on either one of the front and rear substrates is being practiced. According to this method, spacers can be disposed in desired positions on the substrate. Thus, unlike in a spacer scattering method, improper display associated with spacers can be reduced.

Moreover, Japanese Laid-Open Patent Publication No. 2002-055359 discloses a method of forming spacers on a transmission-type LCD, in which columnar spacers are formed by pressing a mold having a surface configuration which defines spacers and contact holes against a resin layer that is provided on the rear substrate. According to this method, spacers can be disposed in desired positions, without performing a photoprocess.

When applying the aforementioned conventional spacer forming methods to a retroreflection-type display device in which an MCCA is employed as the retroreflective layer 106, the following problems may arise.

When a spacer scattering method is employed, spacers are randomly disposed on the retroreflective layer 106, thus resulting in a problem in that sufficient retroreflection characteristics are not exhibited in any regions of the retroreflective layer 106 where spacers are provided (hereinafter "spacer-forming regions"). As a result, the retroreflectance of the retroreflective layer 106 is lowered.

In a spacer forming method which utilizes photolithography, a photoprocess is required for forming spacers, thus resulting in an increase in tact time and cost. Moreover, in order to uniformize the thickness of the liquid crystal layer 113 by reducing the influence of the protrusions and depressions of the retroreflective layer 106, it is desirable to prescribe the diameter (in the case of cylindrical spacers, for example) of the bottom faces of the spacers so as to be greater than the pitch of the retroreflective layer 106, which results in a problem of a lowered aperture ratio.

The aforementioned problem will be specifically described with reference to the figures. FIG. 3A is a schematic cross-sectional view illustrating an exemplary structure of a reflection-type LCD that is produced by using a spacer forming method which utilizes photolithography. The reflection-type LCD shown in FIG. 3A has a similar structure to that of the reflection-type LCD shown in FIGS. 1A and 1B (like reference numerals are given to like constituent elements). FIG. 3B is an upper plan view illustrating an exemplary relationship between the retroreflective layer 106 and a region in which a spacer 115 is formed (spacer-forming region 115r) in the reflection-type LCD shown in FIG. 3A. In the illustrated example, the spacers 115 are quadrangular prisms, and thus the spacer-forming region 115r is represented as a rectangular shape.

In a method which utilizes photolithography, it is possible to control the positions of the spacer-forming regions 115r on the substrate, but it is difficult to precisely align the spacer-forming regions 115r with the minute protrusions and depressions of the retroreflective layer 106. Therefore, as can be seen from FIGS. 3A and 3B, in order to prevent changes in thickness of the liquid crystal layer 113 due to the protrusions and depressions of the retroreflective layer 106, it is necessary to prescribe the width of each spacer-forming region 115r so as to be greater than the pitch $P_{cc}$ of the corner cubes of the retroreflective layer 106. For example, the width of each spacer-forming region 115r is prescribed to be twice the pitch $P_{cc}$ or greater, so that the bottom faces of the spacers 115 will be supported more firmly by a plurality of peak points of the retroreflective layer 106. However, as the spacers 115 increase in size, there will be an increasing proportion occupied by the spacer-forming regions 115r in the retroreflective layer 106, thus deteriorating the retroreflection characteristics of the retroreflective layer 106 and lowering the aperture ratio of the display device.

Although Japanese Laid-Open Patent Publication No. 2002-055359 discloses a transfer-based method of forming spacers in a transmission-type display device, it lacks any description as to applying this method to a reflection-type display device which comprises a reflective layer between the rear substrate and the liquid crystal layer. The inventors have conducted a study to find that, when applying this method to a retroreflection-type display device as shown in FIGS. 1A and 1B, one possible technique might be to form a resin layer on the rear substrate 109 (on which the retroreflective layer 106 has been formed), and then transfer a predetermined surface configuration onto the resin layer to form the spacers, for example. According to this technique, the surface of the retroreflective layer 106 will be planarized by the resin layer, thus making it unnecessary to prescribe a large size for the spacers as in the aforementioned photolithography-based method, so that decrease in the aperture ratio can be suppressed. However, there is a problem in that the spacers will be formed on the viewer side of the retroreflective layer 106, as in the other methods, thus resulting in a deteriorated retroreflectance of the retroreflective layer 106. Moreover, this technique also has problems in that the production process will be complicated due to the additional transfer step, and that the thickness of the entire display device will increase because of the resin layer formed between the retroreflective layer 106 and the liquid crystal layer 113.

Moreover, in the reflection-type display device shown in FIGS. 1A and 1B, the reflective metal layer 105 of the retroreflective layer 106 and the switching elements are connected via contact holes 104. However, any region of the retroreflective layer 106 where a contact hole 104 is formed (hereinafter "contact hole-forming region") may also contribute to deterioration in the retroreflectance of the retroreflective layer 106, as is the case with the spacer-forming regions.

Thus, conventional retroreflection-type display devices have problems in that sufficient retroreflection characteristics cannot be exhibited in the spacer-forming regions and contact hole-forming regions of the retroreflective layer, thus resulting in deterioration of the retroreflectance of the retroreflective layer.

SUMMARY OF THE INVENTION

The present invention has been made in order to overcome the aforementioned problems, and a main objective thereof is to, in a reflection-type liquid crystal display device having a retroreflective layer, suppress deterioration in the retroreflection characteristics of the retroreflective layer due to formation of spacers and/or contact holes, and improve the display contrast.

A reflection-type display device according to the present invention comprises: an optical modulation layer; a pair of substrates between which the optical modulation layer is retained; an electrode structure for causing pixel-by-pixel changes in optical characteristics of the optical modulation layer, wherein, one of the pair of substrates has a corner cube array composed of a plurality of corner cubes; and the corner cube array has a plurality of projections defining an interval between the pair of substrates, the plurality of projections being disposed in peak portions.

In a preferred embodiment, the corner cube array has a plurality of openings penetrating through the corner cube array, the plurality of openings being disposed in peak portions.

The reflection-type display device may further comprise a metal layer formed on the corner cube array, the metal layer having a surface configuration which is defined by the corner cube array.

In a preferred embodiment, the metal layer includes a plurality of reflection electrodes which are spaced apart corresponding to pixels.

In a preferred embodiment, the one substrate further has a plurality of switching elements disposed on a rear face of the corner cube array; and each of the plurality of switching elements is connected to a corresponding one of the reflection electrodes via a corresponding one of the openings.

The plurality of projections and the corner cube array may be formed of a same insulative material.

Each of the plurality of projections may be disposed between adjoining pixels.

Each of the plurality of projections may constitute a wall surrounding a corresponding pixel.

Preferably, a side wall of each of the plurality of projections has a tilt angle less than 90°.

Preferably, a side wall of each of the plurality of openings has a tilt angle greater than 90°.

In a preferred embodiment, each corner cube of the corner cube array is composed of three generally-square faces which are perpendicular to one another.

The plurality of corner cubes may be arrayed with a pitch which is equal to or greater than a wavelength of visible light and is equal to or less than a width of each pixel. In the present specification, "the width of a pixel" refers to, with respect to each pixel in a matrix arrangement, the shorter one of its width along the column direction and its width along the row direction. In each pixel, it is preferable that a plurality of corner cubes be provided along the row direction as well as along the column direction.

Another reflection-type display device according to the present invention comprises: an optical modulation layer; a pair of substrates between which the optical modulation layer is retained; an electrode structure for causing pixel-by-pixel changes in optical characteristics of the optical modulation layer, wherein, one of the pair of substrates has a corner cube array composed of a plurality of corner cubes; and the corner cube array has a plurality of openings penetrating through the corner cube array, the plurality of openings being disposed in peak portions.

In a preferred embodiment, the corner cube array has a plurality of projections defining an interval between the pair of substrates.

A method for producing a reflection-type display device according to the present invention is a method for producing a reflection-type display device which includes: an optical modulation layer; a pair of substrates between which the optical modulation layer is retained; an electrode structure for causing pixel-by-pixel changes in optical characteristics of the optical modulation layer, wherein, one of the pair of substrates has a corner cube array composed of a plurality of corner cubes, the method comprising: a step of providing a mater substrate having protrusions and depressions on a surface thereof; a step of providing a substrate; and a step of forming on the substrate a transfer layer having a surface which corresponds to the protrusions and depressions of the template, wherein, the protrusions and depressions of the template define the shape of a corner cube array which has a plurality of projections defining an interval between the pair of substrates, the plurality of projections being disposed in peak portions.

In a preferred embodiment, the protrusions and depressions of the template define the shape of a corner cube array which has a plurality of openings as well as the plurality of projections, the plurality of openings penetrating through the corner cube array.

The protrusions and depressions of the template may define the shape of a corner cube array in which the plurality of projections and the plurality of openings are disposed in peak portions.

In a preferred embodiment, each of the plurality of projections surrounds a region defining a pixel; and the method further comprises, after the step of forming the transfer layer, a step of forming a pixel electrode in each region defining a pixel.

Another method for producing a reflection-type display device according to the present invention is a method for producing a reflection-type display device which includes: an optical modulation layer; a pair of substrates between which the optical modulation layer is retained; an electrode structure for causing pixel-by-pixel changes in optical characteristics of the optical modulation layer, wherein, one of the pair of substrates has a corner cube array composed of a plurality of corner cubes, the method comprising: a step of providing a template having protrusions and depressions on a surface thereof; a step of providing a substrate; and a step of forming on the substrate a transfer layer having a surface which corresponds to the protrusions and depressions of the template, wherein, the protrusions and depressions of the template define the shape of a corner cube array which has a plurality of openings penetrating through the corner cube array, the plurality of openings being disposed in peak portions.

In a preferred embodiment, the protrusions and depressions of the template define the shape of a corner cube array which has a plurality of projections as well as the plurality of openings, the plurality of projections defining an interval between the pair of substrates.

A corner cube array according to the present invention is a corner cube array having a plurality of corner cubes, comprising: a plurality of projections each provided in a bottom portion of the corner cube array; and a plurality of holes each provided in a bottom portion of the corner cube array. This corner cube array can be used as the aforementioned template in the aforementioned method for producing a reflection-type display device.

According to the present invention, in a reflection-type liquid crystal display device which includes a corner cube array as a retroreflective layer, the positions of spacers and the positions of contact holes in each corner cube can be controlled, so that deterioration in retroreflection characteristics associated with the spacers and contact holes can be suppressed. As a result, an improved display contrast can be provided. Since the spacer size can be kept small, and the positions in which to form the spacers are controllable, it is possible to suppress lowering of the aperture ratio due to the spacers, whereby brighter display is realized.

Moreover, according to the present invention, the above-described reflection-type liquid crystal display device can be easily produced, without requiring a more complicated process than conventional processes.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 9 is a schematic cross-sectional view showing a reflection-type display device according to a second embodiment of the present invention.

FIG. 10 is a schematic cross-sectional view showing a reflection-type display device according to a third embodiment of the present invention.

DETAILED DESCRIPTION OF PREFERRED EMBODIMENTS

Hereinafter, preferred embodiments of the present invention will be described with reference to the accompanying drawings.

Figure 1A:
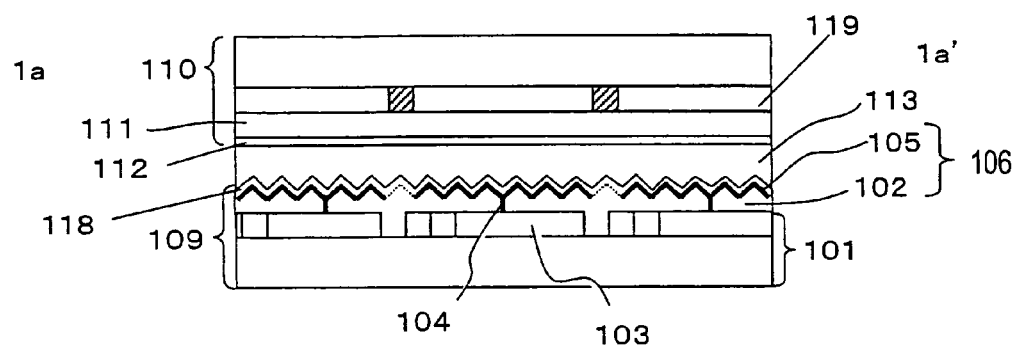
FIG. 1A is a schematic cross-sectional view showing the structure of a conventional retroreflection-type LCD.
Figure 1B:
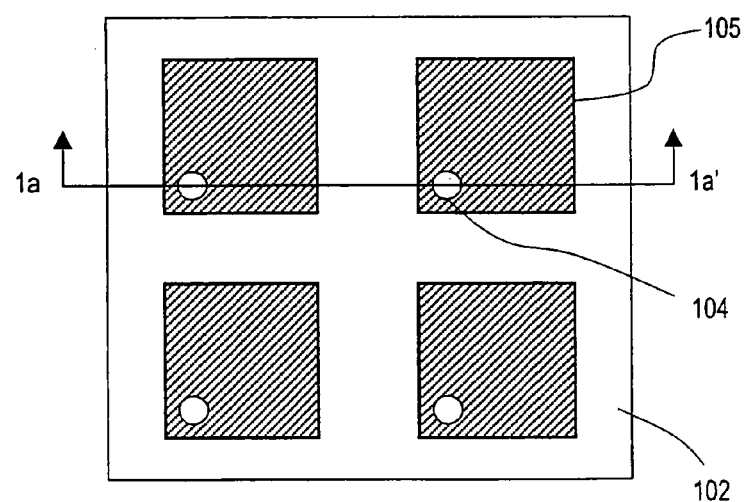
FIG. 1B is a plan view showing reflection electrodes of the display device of FIG. 1A.
Figure 2A:
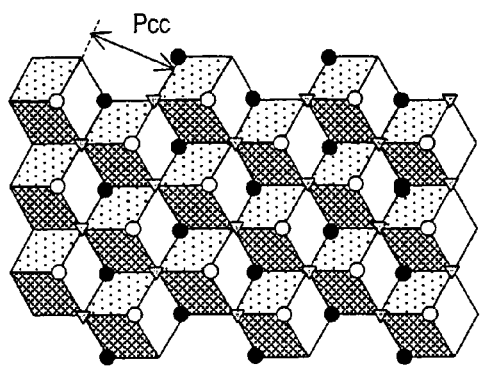
FIGS. 2A and 2B are a plan view and a perspective view, respectively, of a corner cube array.
Figure 2B:
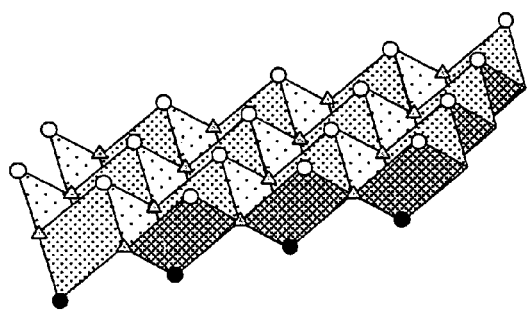
Figure 3A:
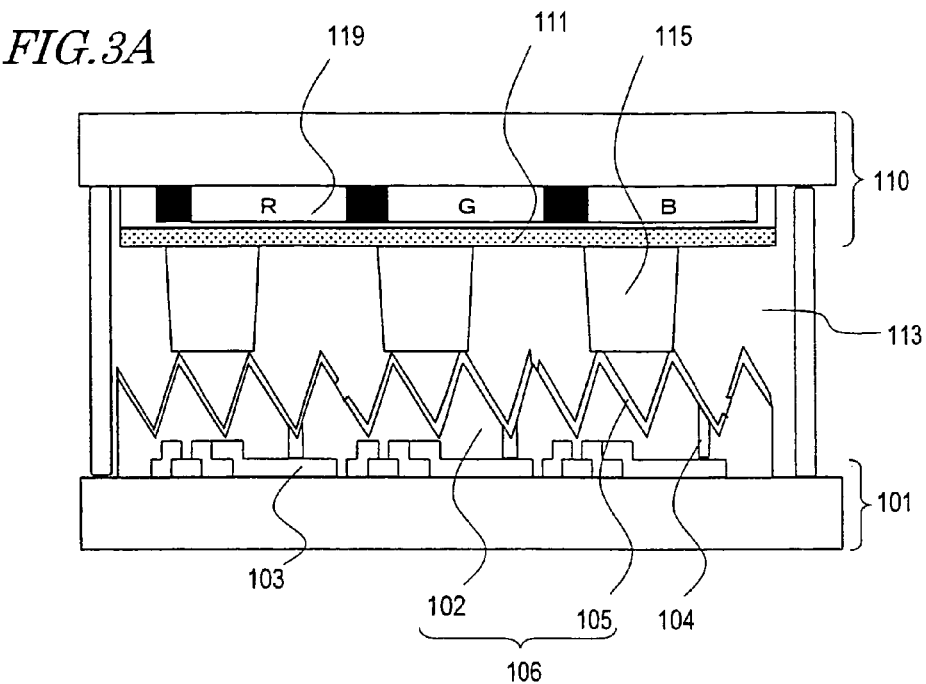
FIG. 3A is a schematic cross-sectional view showing a reflection-type LCD which is produced by a conventional spacer forming method that utilizes photolithography.
Figure 3B:
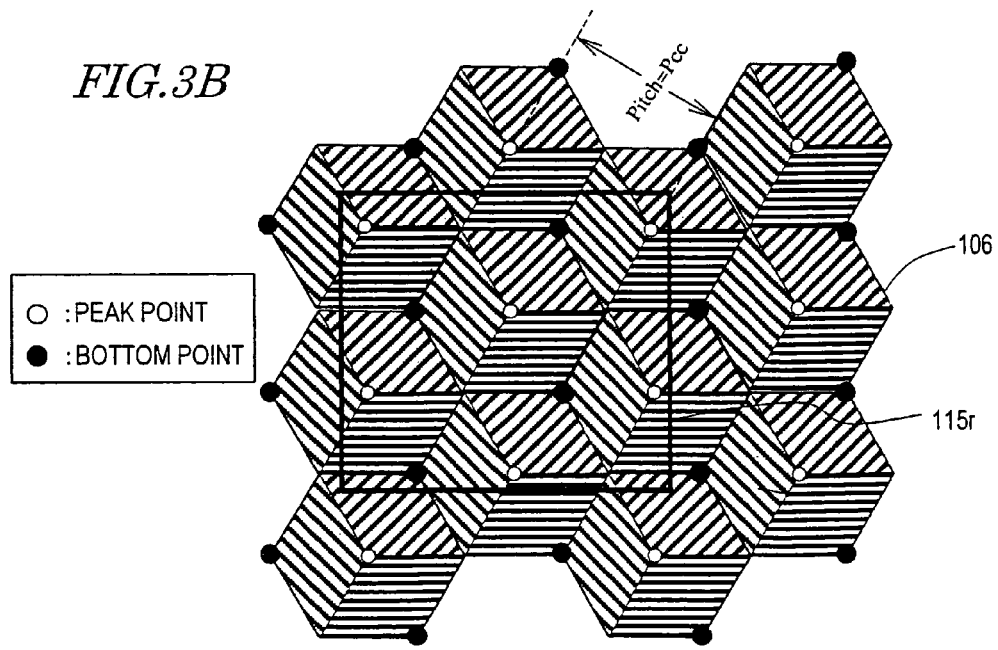
FIG. 3B is an upper plan view showing a relationship between the retroreflective layer and a spacer-forming region in the reflection-type LCD shown in FIG. 3A.

In a retroreflection-type LCD of the active matrix-type as shown in FIGS. 1A and 1B, when using a corner cube array as a retroreflective layer, there is a problem in that its retroreflection characteristics are deteriorated due to spacer-forming regions and contact hole-forming regions in the retroreflective layer, thus resulting in a lowered display contrast, as described above. The reason is that, in the spacer-forming regions and contact hole-forming regions on the surface of the retroreflective layer, light which has been transmitted through the liquid crystal layer cannot be reflected at a predetermined angle, so that the effective area of the retroreflective regions on the surface of the retroreflective layer decreases. In the present specification, any region (a spacer-forming region or a contact hole-forming region) which no longer exhibits retroreflection properties because of the spacers and contact holes formed on the surface of the retroreflective layer will be referred to as a "non-retroreflective region".

Improvement in the retroreflection characteristics of a retroreflective layer could be obtained by minimizing the area of the non-retroreflective regions. However, the inventors have conducted studies to find that, even if the area of the non-retroreflective regions remains the same, the retroreflection characteristics will vary depending on the position of each non-retroreflective region with respect to each unit feature (corner-cube) of the retroreflective layer; that is, deterioration in the retroreflection characteristics can be suppressed by controlling the positions of the non-retroreflective regions. Specifically, it has been found that deterioration in the retroreflection characteristics can be more suppressed by disposing each non-retroreflective region near the peak point of a corner cube, than in the case where each non-retroreflective region is disposed near the bottom point of a corner cube. Hereinafter, this principle will be specifically described with reference to the figures.

Figure 4A:
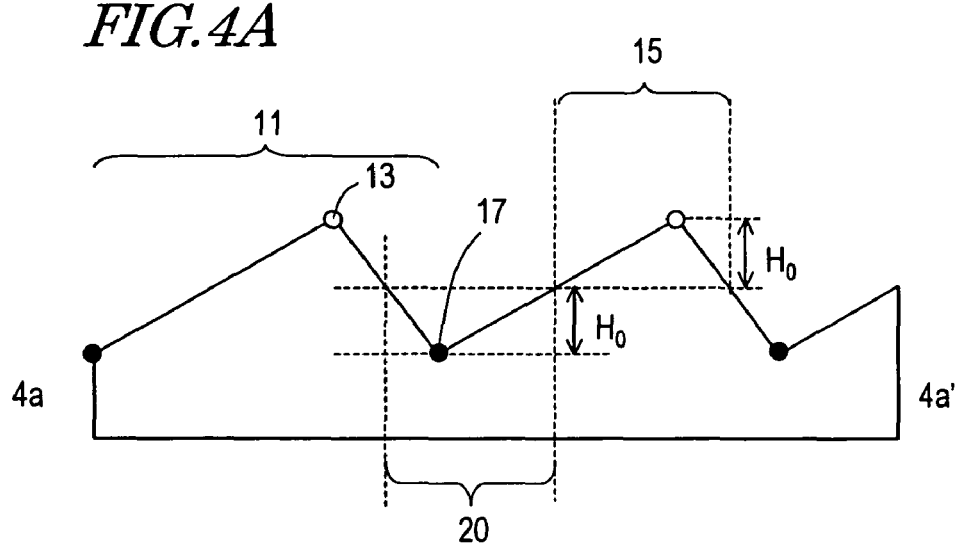
FIGS. 4A and 4B are a cross-sectional view and a plan view, respectively, for explaining the retroreflection characteristics of a corner cube array.
Figure 4B:
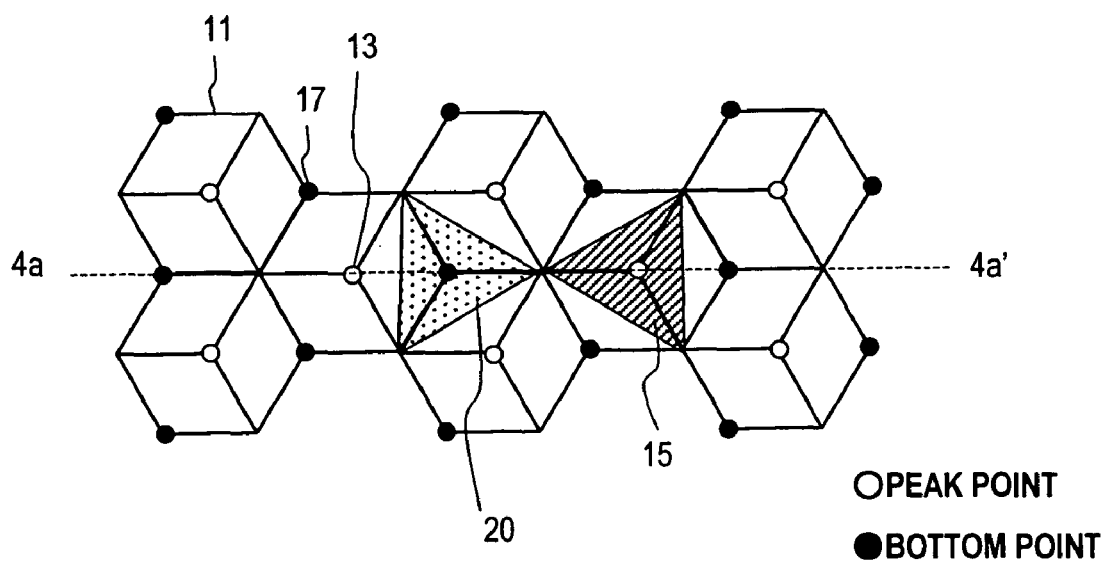

FIGS. 4A and 4B are a cross-sectional view and a plan view, respectively, of a corner cube array (cubic corner cube array), which is a two-dimensional array of corner cubes 11 each composed of three generally-square faces which are perpendicular to one another. Although a cubic corner cube array is exemplified here, any other type of corner cube array may be used instead.

In the corner cube array shown in FIGS. 4A and 4B, comparisons in retroreflection characteristics were made between the case where non-retroreflective regions are disposed in peak portions 15 of the corner cubes 11 and the case where non-retroreflective regions are disposed in bottom portions 20 of the corner cubes 11, the area of the non-retroreflective regions being the same for both cases. As a result, it was found that the retroreflection characteristics are better in the case where each non-retroreflective region is disposed in an peak portion 15 than in the case where each non-retroreflective region is disposed in a bottom portion 20. This is presumably because the bottom portions 20 in the corner cube array make greater contributions to the retroreflection characteristics than the peak portions 15.

In the present specification, an "peak point" of a corner cube is defined as a point 13 which appears protruding (i.e., highest) toward the light incident side, whereas a "bottom point" of a corner cube is defined as a point 17 which appears depressed (i.e., deepest) as seen from the light incident side. An "peak portion 15" refers to a triangular-pyramidal region centered around an peak point 13, further defined by a height $H_0$ which is approximately ½ of the difference in height between the peak points 15 and the bottom points 17. A "bottom portion 20" refers to a triangular-pyramidal region centered around a bottom point 17, further defined by the aforementioned height $H_0$.

Based on the above finding, the reflection-type display device of the present invention employs as a retroreflective layer a corner cube array in which non-retroreflective regions are disposed in the peak portions 15 of corner cubes. In other words, the corner cube array according to the present invention is characterized in that spacers (which define the interval between a pair of substrates) and/or contact holes (through which pixel electrodes are connected to switching elements) are disposed in the peak portions.

Hereinafter, embodiments of the reflection-type display device according to the present invention will be described with reference to the figures.

Embodiment 1

Figure 5:
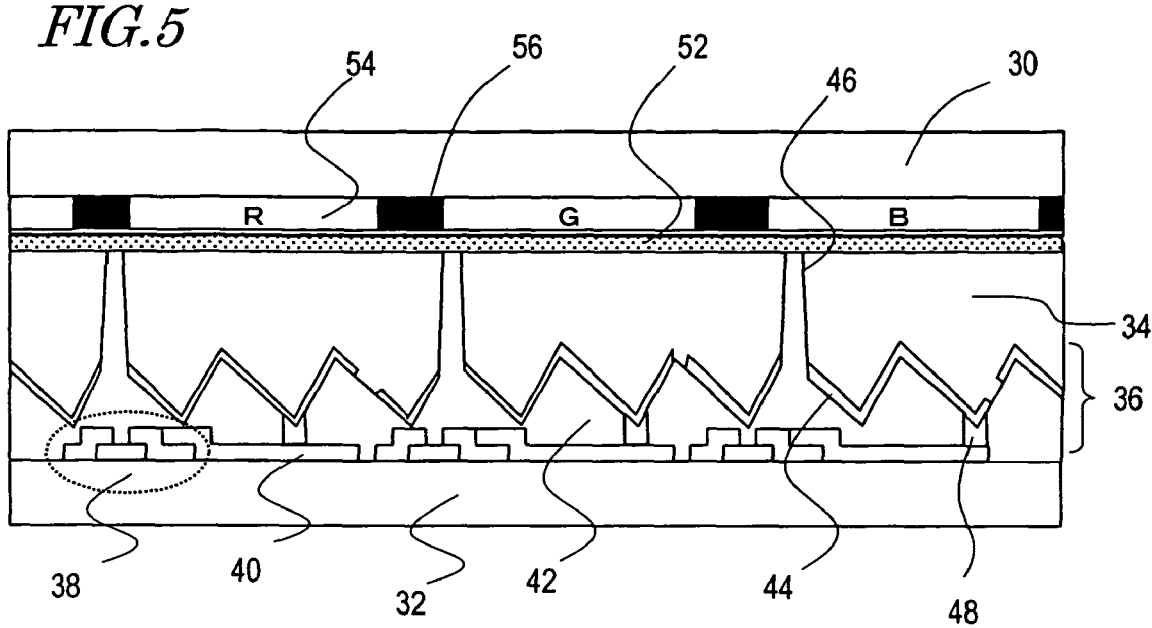
FIG. 5 is a schematic cross-sectional view showing a reflection-type display device according to a first embodiment of the present invention.

FIG. 5 is a schematic cross-sectional view showing a reflection-type display device according to a first embodiment of the present invention. In the present embodiment, as a retroreflective layer, a corner cube array which has projections functioning as spacers at peak portions is used.

The reflection-type display device comprises a front substrate 30, a rear substrate 32 opposing the front substrate 30, and a liquid crystal layer 34 which is retained between the front substrate 30 and the rear substrate 32. On the surface of the front substrate 30 facing the liquid crystal layer, a plurality of color filters 54 as well as a black matrix 56 interposed between adjoining color filters 54, and a transparent electrode 52 are provided in this order. On the surface of the rear substrate 32 facing the liquid crystal layer, switching elements 38 are formed respectively corresponding to the pixels. Herein, thin film transistors (TFTs) are used as the switching elements 38. A corner cube array 36 is provided between the switching elements 38 and the liquid crystal layer 34.

The corner cube array 36 of the present embodiment includes: an insulating layer 42 having a surface configuration which defines the corner cube array; a metal layer 44 formed on the insulating layer 42 and having a shape which reflects the surface configuration of the insulating layer 42; and a plurality of projections 46 disposed in the peak portions of the corner cubes. Herein, the metal layer 44 is split apart so as to correspond to the pixels, each split portion functioning as a reflection electrode. The plurality of projections 46 function as spacers defining the interval between the front substrate 30 and the rear substrate 32. In the illustrated example, the region occupied by each projection 46 includes the peak point in an peak portion as described with reference to FIGS. 4A and 4B. However, each projection 46 simply needs to be disposed within an peak portion, without having to be disposed on the peak point itself. Preferably, the projections 46 are so small that each projection 46 is accommodated within a single peak portion. The corner cube array 36 has a plurality of openings 48 formed therein, each of which penetrates through the insulating layer 42 and reaches the surface of a drain electrode 40 of a switching element 38. The openings 48 function as contact holes for connecting the metal layer 44 to the switching elements 38. Although the openings 48 are illustrated as being formed in the bottom portions of the corner cubes, the present embodiment provides no limitation as to the positions of the openings 48.

The liquid crystal layer 34 of the present embodiment is a light scattering-type liquid crystal layer composed of a polymer or low molecular scattering-type liquid crystal material, e.g., polymer dispersed liquid crystal (PDLC), and is preferably composed of a reverse-type PLDC having a liquid crystal backbone (mesogen groups) in its polymeric structure. In the present embodiment, voltages are applied across the liquid crystal layer 34 in a pixel-by-pixel manner by the transparent electrode 52 and the metal layer 44, whereby the optical characteristics of the liquid crystal layer 34 are switched between a transparent state (in the absence of an applied voltage) and a scattering state (under an applied voltage). Under an applied voltage, "white" is displayed. In the absence of an applied voltage, the liquid crystal layer becomes transparent, so that "black" is displayed via retroreflection.

Note that the liquid crystal layer 34 of the present embodiment only needs to be a layer whose optical characteristics change in accordance with applied voltages, and is not limited to the aforementioned scattering-type liquid crystal layer. Instead of the liquid crystal layer 34, any other type of modulation layer whose optical characteristics change in accordance with voltages.

In the reflection-type display device of the present embodiment, the projections 46 serving as spacers are disposed in the peak portions of the corner cubes. Therefore, the bottom portions of the corner cubes are free of any non-retroreflective regions associated with the projections 46, and thus deterioration in the retroreflection characteristics at the bottom portions is suppressed. As a result, the retroreflectance of the corner cube array 36 is enhanced, and the display contrast is improved.

Since the spacer size can be made smaller than conventionally, the aperture ratio is also improved. In order to obtain an improved aperture ratio, it is preferable that the width of each spacer-forming region, i.e., the diameter (when each region is circular) or one side (when each region is rectangular) thereof, is less than twice the pitch $P_{cc}$ of the corner cubes, e.g., a value less than the pitch $P_{cc}$. The width may even be 50% or less of the pitch $P_{cc}$ so long as it is still possible to control the cell thickness to a desired value.

Note that, in order to further reduce the deterioration in the retroreflectance or aperture ratio due to the spacers, it is preferable to dispose the projections 46 in between adjoining pixels. For example, in the structure shown in FIG. 5, if the projections 46 are disposed so as to be overlapped by the black matrix 56, any deterioration in the displaying characteristics caused by the spacers can be suppressed even more effectively.

Figure 6A:
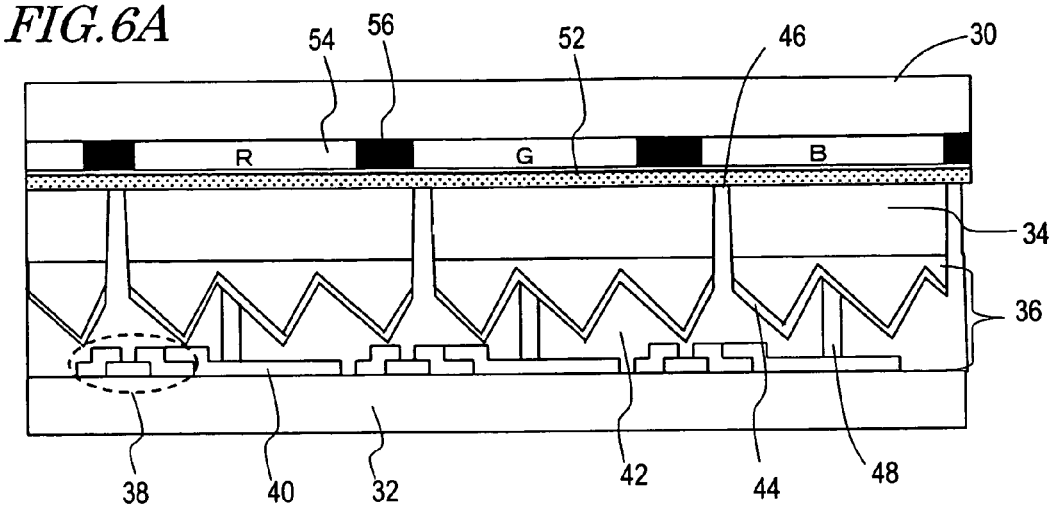
FIG. 6A is a schematic cross-sectional view showing another reflection-type display device according to the first embodiment of the present invention.
Figure 6B:
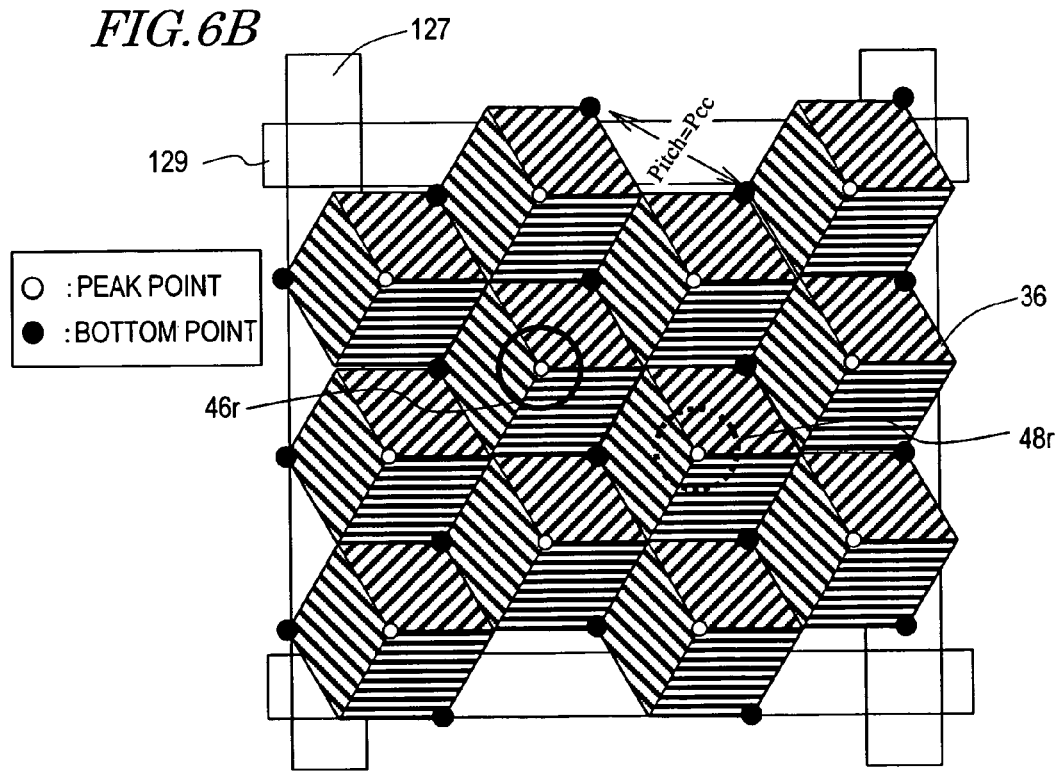
FIG. 6B is an upper plan view showing a relationship between the corner cube array configuration and the contact hole-forming regions and spacer-forming regions in the reflection-type display device of FIG. 6A.

Similarly to the projections 46, it is preferable that the openings 48 serving as contact holes are disposed in the peak portions of the corner cubes. FIG. 6A is a schematic cross-sectional view showing a reflection-type display device having a corner cube array 36 whose projections 46 and openings 48 are disposed in the peak portions. For simplicity, constituent elements which are similar to those in FIG. 5 are denoted by similar reference numerals. FIG. 6B is a plan view showing an exemplary relationship between the corner cube array configuration and the contact hole-forming regions and spacer-forming regions in the reflection-type display device of FIG. 6A. FIG. 6B show source lines 127 and gate lines 129 that are provided on the rear substrate 32, which together define a pixel region. Note that the number of corner cubes to be contained in each pixel region is determined by the size of each pixel region and/or the pitch of the corner cubes, and is not limited to the number illustrated herein.

In accordance with the structure shown in FIGS. 6A and 6B, spacer-forming regions 46r associated with the projections 46 and contact hole-forming regions 48r associated with the openings 48 are not formed in the bottom portions of the corner cubes, so that it is possible to further improve the retroreflectance of the corner cube array 36.

Next, with reference to the figures, a method for forming the corner cube array 36 of the reflection-type display device according to the present embodiment will be described, by taking a method for forming the corner cube array 36 shown in FIGS. 6A and 6B, for example.

Figure 7A:
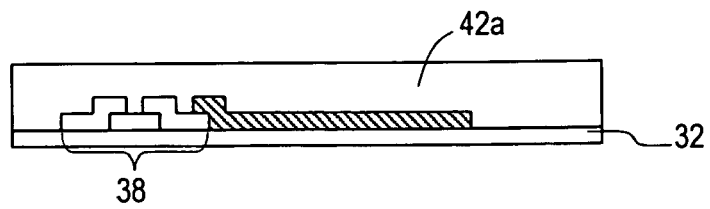
FIGS. 7A to 7E are step-by-step cross-sectional views for explaining a method for forming a corner cube array according to the first embodiment.

First, as shown in FIG. 7A, a resin layer 42a is formed on the rear substrate 32 having the switching elements 38 formed on its surface. The resin layer 42a can be formed by applying a resin material having photosensitivity on the rear substrate 32, by using a coater such as a spin coater, a die coater, or a cap coater. However, the method for forming the resin layer 42a is not limited to application methods. Alternatively, a method of attaching a layer containing a resin material (e.g., a dry film) onto the rear substrate 32 may be adopted. Moreover, as the resin material, any other type of resin material which is capable of retaining its shape may be used instead of a photosensitive resin material (e.g., acrylic resin). For example, a thermosetting resin material may be used.

Figure 7B:
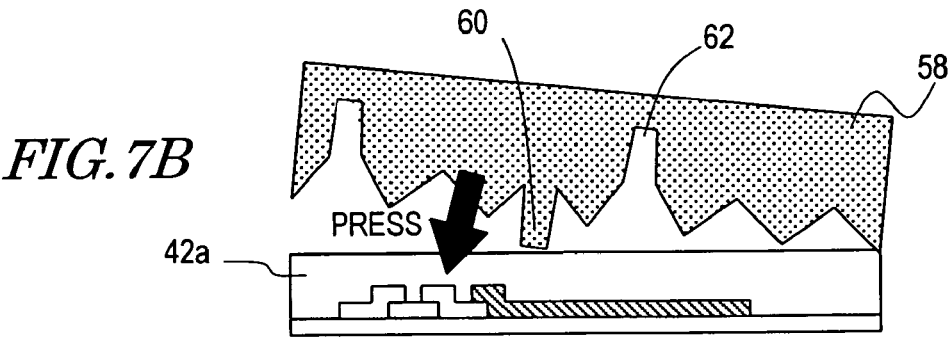

Next, by using a template (e.g., a die made of metal, resin, etc.) 58 having protrusions and depressions on its surface, the protrusions and depressions of the template 58 are transferred onto the resin layer 42a by an embossing technique or the like, as shown in FIG. 7B. As used herein, the "template" refers to a mold for shaping the resin layer 42a by a transfer technique.

Specifically, the template 58 is attached to the surface of the resin layer 42a. The template 58 has protrusions and depressions which correspond to the surface configuration of the corner cube array 36 as shown in FIGS. 6A and 6B. In other words, the template 58 in itself is a corner cube array which has projections 60 and holes 62 on its bottom portions. The projections 60 and holes 62 define the openings (contact holes) and projections (spacers) of the corner cube array 36, respectively.

Figure 7C:
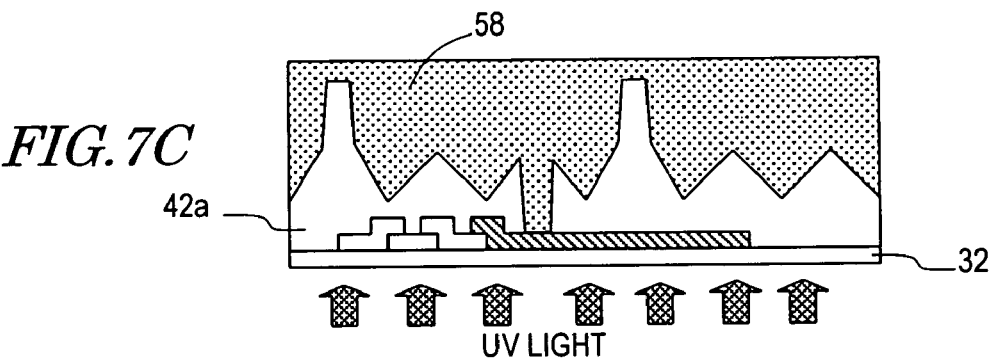

Thereafter, as shown in FIG. 7C, the resin layer 42a is cured by being irradiated with ultraviolet light. The exposure of the resin layer 42a is illustrated as being performed from the rear-face side of the rear substrate 32. Alternatively, the exposure may be performed from the front-face side of the rear substrate 32 in the case where a transparent template 58 composed of a material which permits exposure therethrough (e.g., glass, quartz, or plastic) is used. In the case where a thermosetting resin material is used as the material of the resin layer 42a, the resin layer 42a can be cured by being heated.

Figure 7D:
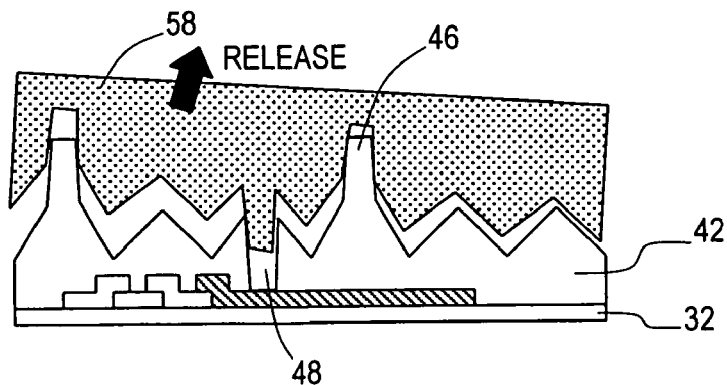

Next, as shown in FIG. 7D, by removing the template 58 from the rear substrate 32, an insulating layer 42 having a corner cube array configuration is obtained. The resultant insulating layer 42 has projections 46 and openings 48 formed in the peak portions of the corner cubes. Removal of the template 58 can be performed while obliquely tilting the template 58 with the substrate 32 being fixed, as shown. Alternative methods would be to remove the template 58 while irradiating the substrate 32 with ultrasonic waves, or remove the template 58 by spewing a high pressure gas into the interspace between the cured resin layer 42a (insulating layer 42) and the template 58.

Figure 7E:
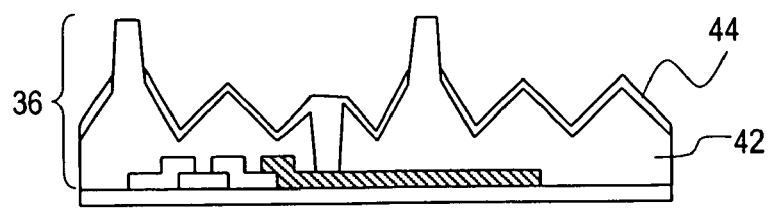

Next, as shown in FIG. 7E, a metal layer (e.g., an Ag layer) 44 is formed on the surface of the insulating layer 42 by sputtering technique, vapor deposition technique, or the like, and patterning is performed as necessary. As a result, the corner cube array 36 is formed.

In the above method, the resin layer 42a is formed by applying a resin material onto the surface of the substrate 32. Alternatively, a resin material may be applied on the surface of the template 58 and then pressed against the rear substrate 32, followed by curing of the resin material. In either case, it is preferable to carry out the attachment of the substrate 32 and the template 58 under reduced pressure. In this way, bubbles can be prevented from occurring in the interspace between the resin layer 42a and the template 58 or the interspace between the resin material and the substrate 32. By thus suppressing unwanted bubbles, a good insulating layer 42 can be formed.

Although the above-described method forms a corner cube array 36 whose projections 46 and openings 48 are disposed in the peak portions, the openings 48 do not need to be disposed in the peak portions according to the present embodiment, as exemplified in FIG. 5. Moreover, although the above method forms not only the projections 46 but also the openings 48 by transferring the surface configuration of the template 58, it would also be possible to perform a transfer to form an insulating layer 42 having the projections 46, and then perform a photolithography process or the like to form the openings 48 in the insulating layer 42.

As described earlier, with conventional spacer forming methods, it would be very difficult to certainly dispose the projections 46 and openings 48 in the peak portions of the minute corner cube array 36. Moreover, in order to exert precise control over the thickness of the liquid crystal layer, it would be necessary to prescribe large spacer-forming regions in accordance with the pitch $P_{cc}$ of the corner cube array 36. Specifically, in the case where each spacer-forming region is circular, the diameter thereof would have to be twice the pitch $P_{cc}$ of the corner cube array or even greater, thus resulting in a lower aperture ratio.

In contrast, according to the method illustrated with reference to FIGS. 7A to 7E, the insulating layer 42 having a corner cube array configuration, as well as the projections 46 and openings 48, can be integrally formed through transfer. Therefore, the positions of the projections 46 and openings 48 can be precisely controlled. As a result, with a greater certainty, the projections 46 and openings 48 can be disposed in the peak portions of the corner cubes, whereby deterioration in the retroreflection characteristics of the corner cube array 36 is suppressed. Moreover, since the area of each region in which a projection 46 is formed (spacer-forming region) can be made smaller than conventionally, a decrease in the aperture ratio due to the spacers can be suppressed. Furthermore, irrespective of the height of the corner cube array 36 (i.e., the level difference between the peak points and the bottom points), the thickness of the liquid crystal layer 34 can be highly precisely controlled by the projections 46.

Figure 8A:
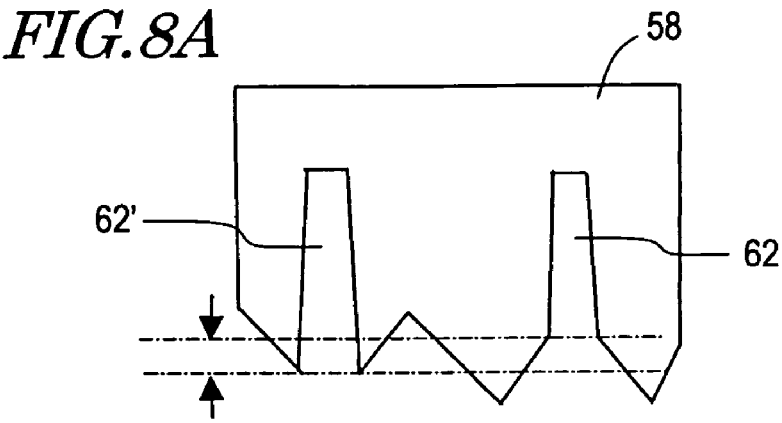
FIGS. 8A to 8C are enlarged cross-sectional views for explaining the configuration of a template to be used for forming a corner cube array.

Referring to FIG. 8A, since the holes 62 in the template 58 are disposed in the bottom portions of the template 58, the aspect ratio (i.e., the ratio of depth to diameter) of each hole 62 is smaller than the aspect ratio of a hole 62' which is disposed in an peak portion of the template 58. This provides an advantage in that the template 58 is easy to process, and that the template 58 can be easily removed from the substrate 32. On the other hand, the projections 60 disposed in the bottom portions of the template 58 would be higher (or more elongated) than any projection that is disposed in an peak portion of the template 58. However, generally speaking, any protrusion in the template 58 (e.g., the projections 60) is easier to remove from the resin layer 42a than is a depression (e.g., the holes 62), and thus there is not much problem at removal.

Figure 8B:
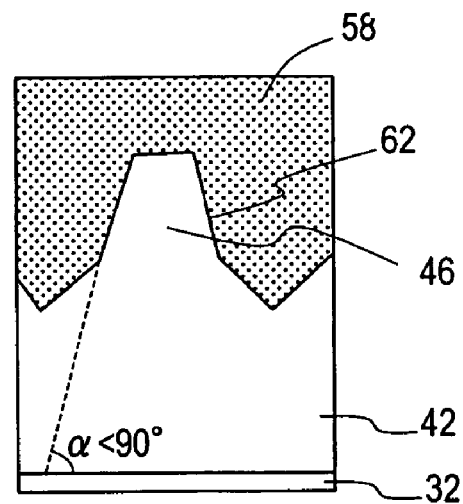
Figure 8C:
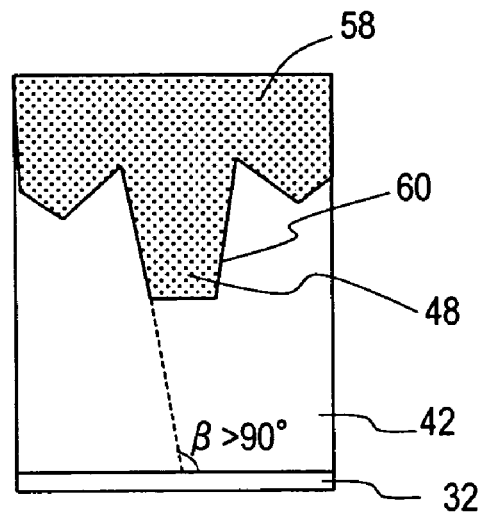

In order to further facilitate the removal of the template 58 from the substrate 32, as shown in FIGS. 8B and 8C, the side walls of the holes 62 and projections 60 of the template 58 are preferably tilted. FIGS. 8B and 8C are schematic cross-sectional views each showing a state after the template 58 is pressed against the substrate 32 and the resin layer 42a is cured, and before the template 58 is removed from the substrate 32. For simplicity, the switching elements on the substrate 32 are omitted from illustration.

Firstly, as shown in FIG. 8B, the side wall(s) of each hole 62 of the template 58 is preferably tilted, whereby the hole 62 is shaped so that the area of any cross section taken parallel to the bottom face of the hole 62 becomes smaller in the depth direction of the hole 62. In this case, the shape of the hole 62 is reflected in the resultant corner cube array 36, so that the side wall(s) of the corresponding projection 46 has a tilt angle α which is less than 90°. In the present specification, the "tilt angle α of the side wall(s) of a projection 46" is defined as an angle between the side wall(s) of the projection 46 and the surface of the substrate 32, the angle taken on the "inside" (i.e., closer to the center of the hole 62 of the template 58).

Moreover, as shown in FIG. 8C, the side wall(s) of each projection 60 of the template 58 is preferably tilted, whereby the projection 60 is shaped so that it becomes thinner in its height direction. In this case, the shape of the projection 60 is reflected in the resultant corner cube array 36, so that the side wall(s) of the corresponding opening 48 has a tilt angle β which is greater than 90°. In the present specification, the "tilt angle β of the side wall(s) of an opening 48" is defined as an angle between the side wall(s) of the opening 48 and the surface of the substrate 32, the angle taken on the "inside" (i.e., closer to the center of the projection 60 of the template 58).

The template 58 which is used for forming the corner cube array 36 according to the present embodiment can be fabricated by, after forming a corner cube array (template) through anisotropic etching, forming the projections 60 and holes 62 in the bottom portions of the resultant corner cube array (template), by using the methods disclosed in the Applicant's Japanese Laid-Open Patent Publication Nos. 2003-066211 and 2003-185817, for example. The projections 60 and holes 62 may be formed through etching, for example.

Alternatively, for a corner cube array which is obtained through anisotropic etching, a photolithography process may be performed to form the projections 60 with a resist, and then the holes 62 alone may be formed through etching. However, if a corner cube array thus obtained is used as the template 58 for repeated transfer processes, the resist composing the projections 60 may deteriorate through the repeated transfer processes. In order to avoid this, an electroformed mold may be produced by performing plating on a corner cube array on which the projections 60 and holes 62 have been formed. The electroformed mold thus obtained is advantageous because it is unlikely to deteriorate even after repeated use in transfer processes.

Alternatively, on the aforementioned corner cube array which is obtained through anisotropic etching, plating (e.g., electroplating or electroless plating) or the like may be performed to fabricate an electroformed mold having a corner cube array configuration, and thereafter the holes 62 may be formed in this electroformed mold by using a micromachining drill, such as an end mill.

In the above method which has been described with reference to FIGS. 7A to 7E, the insulating layer 42 and the projections 46 of the corner cube array 36 are formed of the same resin material. However, these elements may be formed of different materials. For example, a multilayer resin layer 42a including a plurality of resin layers may be formed, and the protrusions and depressions of the template 58 may be transferred onto the resin layer 42a, thus forming a corner cube array 36 in which the material of at least part of the projections 46 differs from the material of the insulating layer 42.

The structure of the reflection-type display device of the present embodiment is not limited to the structures shown in FIG. 5 and FIGS. 6A and 6B.

In the structures shown in FIG. 5 and FIGS. 6A and 6B, a part of each projection 46 serving as a spacer is disposed inside a pixel, thus possibly affecting the aperture ratio of the display device. Therefore, it is preferable to align the projections 46 and the black matrix 56 (color filter 54) in such a manner that the projections 46 are overlapped by the black matrix 56, thus placing the projections 46 in between pixels. As a result, the aperture ratio of the display device is further improved.

Moreover, in the structures shown in FIG. 5 and FIGS. 6A and 6B, the metal layer 44 not only constitutes the reflective surface of the corner cube array 46 but also functions as reflection electrodes which are spaced apart corresponding to the pixels. However, the metal layer 44 does not need to function as reflection electrodes. In that case, it is necessary to further form transparent pixel electrodes between the corner cube array 46 and the liquid crystal layer 34.

The corner cube array 36 of the present embodiment is illustrated as a cubic corner cube array, comprising corner cubes each composed of three generally-square faces which are perpendicular to one another. However, a corner cube array comprising any other type of corner cubes, e.g., corner cubes each composed of three right isosceles triangle faces which are perpendicular to one another, may alternatively be used.

Although there is no limitation as to the pitch of the corner cube array 36, the pitch may be equal to or greater than the wavelength of visible light, and equal to or less than the pixel width, for example. As a result, problems of displaying characteristics such as intermixing of colors can be suppressed. Moreover, the transfer-based method for forming a corner cube array which has been described with reference to FIGS. 7A to 7E is especially advantageously used for forming a corner cube array 36 which is of such a size that it is difficult to precisely control the spacer-forming regions by any conventional methods (pitch: e.g., 25 μm or less, and more preferably 2.5 μm or less).

Embodiment 2

Hereinafter, a second embodiment of the reflection-type display device according to the present invention will be described. The reflection-type display device of the present embodiment has a similar structure to that of the reflection-type display device of Embodiment 1 (described with reference to FIG. 5) except for the positions of projections and openings of the corner cube array.

FIG. 9 is a schematic cross-sectional view showing the corner cube array according to the present embodiment. The corner cube array 66 includes: an insulating layer 72 having a surface configuration which defines the corner cube array; a plurality of projections 76; a metal layer 74 formed on the insulating layer 72 and having a shape which reflects the surface configuration of the insulating layer 72; and a plurality of opening 78 being disposed in the peak portions of the corner cubes and penetrating through the insulating layer 72. As in the structure shown in FIG. 5, the metal layer 74 is split apart so as to correspond to the pixels, each split portion functioning as a reflection electrode. The projections 76 function as spacers, and the openings 78 function as contact holes. In the illustrated example, the region occupied by each opening 78 includes the peak point in an peak portion as described with reference to FIGS. 4A and 4B. However, each opening 78 simply needs to be disposed within an peak portion. In the present embodiment, there is no limitation as to the positions of the projection 76 in the corner cube.

In the reflection-type display device of the present embodiment, the openings 78 serving as contact holes are disposed in the peak portions of the corner cubes. Therefore, the bottom portions of the corner cubes are free of any non-retroreflective regions associated with the openings 78, and thus deterioration in the retroreflection characteristics at the bottom portions is suppressed. As a result, the retroreflectance of the corner cube array 66 is enhanced, and the display contrast is improved.

The illustrated corner cube array 66 can be easily formed by the method which has been described with reference to FIGS. 7A to 7E, using a template having protrusions and depressions which correspond to the surface configuration of the insulating layer 72. This provides an advantage in that the positions of the openings 78 can be precisely controlled. Since the projections 76 serving as spacers are formed through transfer, the size of the projections 76 can be made smaller than conventionally, and therefore, decrease in the aperture ratio of the display device can be suppressed. Furthermore, the positions of the projections 76 can be controlled based on the surface configuration of a template which is used for the transfer, and the projections 76 may be disposed in between pixels of the display device, whereby the aperture ratio can be further improved.

Alternatively, a template having a corner cube array configuration that has projections in the bottom portions may be used to perform a transfer for forming an insulating layer 72 which has the openings 78, and thereafter spacers may be formed by a conventional method.

Embodiment 3

Hereinafter, a third embodiment of the reflection-type display device according to the present invention will be described. The reflection-type display device of the present embodiment differs from the reflection-type display devices of Embodiments 1 and 2 in that: the projections of the corner cube array function not only as spacers but also as partitioning walls between pixels; the surface (having protrusions and depressions) of the corner cube array is planarized; and upper-layer electrodes (pixel electrodes) are further provided on the corner cube array.

FIG. 10 is a schematic cross-sectional view showing the reflection-type display device of the present embodiment. For simplicity, constituent elements which are similar to those of the reflection-type display device shown in FIG. 5 are denoted by similar reference numerals, and the descriptions thereof are omitted.

A corner cube array 80 is formed on a rear substrate 32 of the reflection-type display device. The corner cube array 80 includes: an insulating layer 82 which defines a corner cube array configuration; a metal layer 84 formed on the surface of the insulating layer 82; and a plurality of openings 88 and a plurality of projections 86. Herein, each projection 86 is shaped as a wall which surrounds a corresponding pixel, and functions not only as a spacer but also as a partitioning wall between pixels. The metal layer 84 is split apart by the projections 86 so as to correspond to the pixels. In each region (pixel region) 90 surrounded by a projection 86, a transparent upper-layer electrode (pixel electrode) 89 is provided. The surface of each pixel electrode 89 is generally flat, and therefore the liquid crystal layer 34 has a generally flat surface facing the rear substrate. Each pixel electrode 89 is connected to a drain electrode 40 of a corresponding switching element 38 via an opening 88. Although the illustrated opening 88 is shown to be disposed in an peak portion of a corner cube, the corner cube array 80 of the present embodiment is characterized in that the openings 88 and/or the projections 86 are disposed in the peak portions, without being limited to the illustrated structure.

Figure 11A:
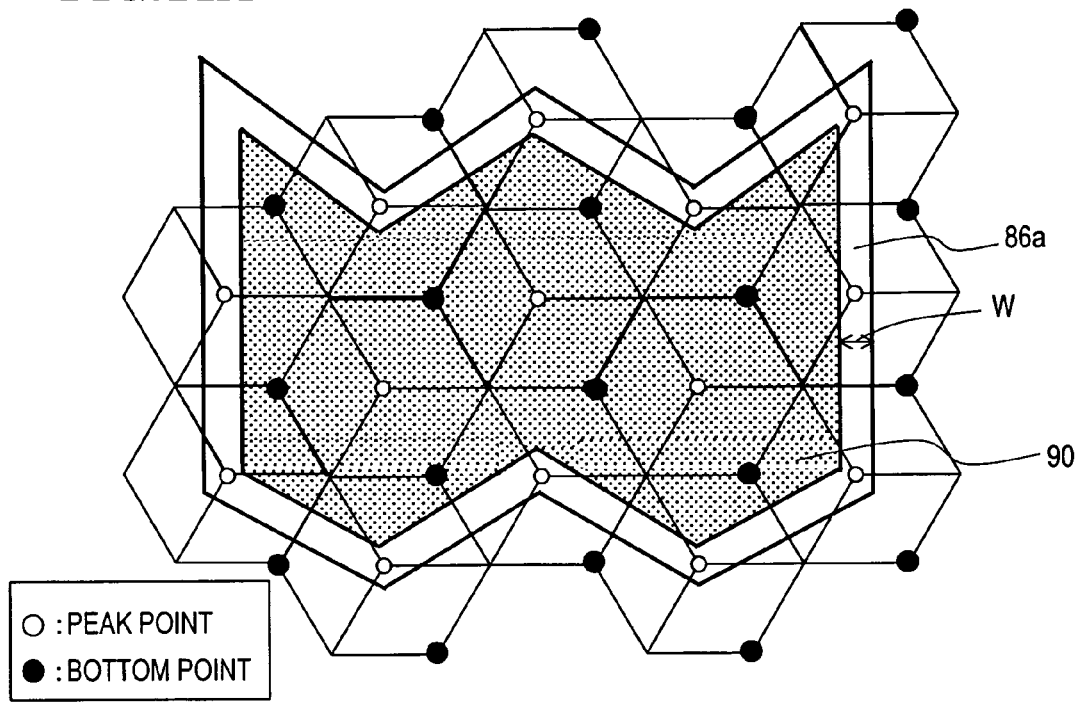
FIGS. 11A and 11B are plan views each explaining a preferable projection arrangement according to the third embodiment.
Figure 11B:
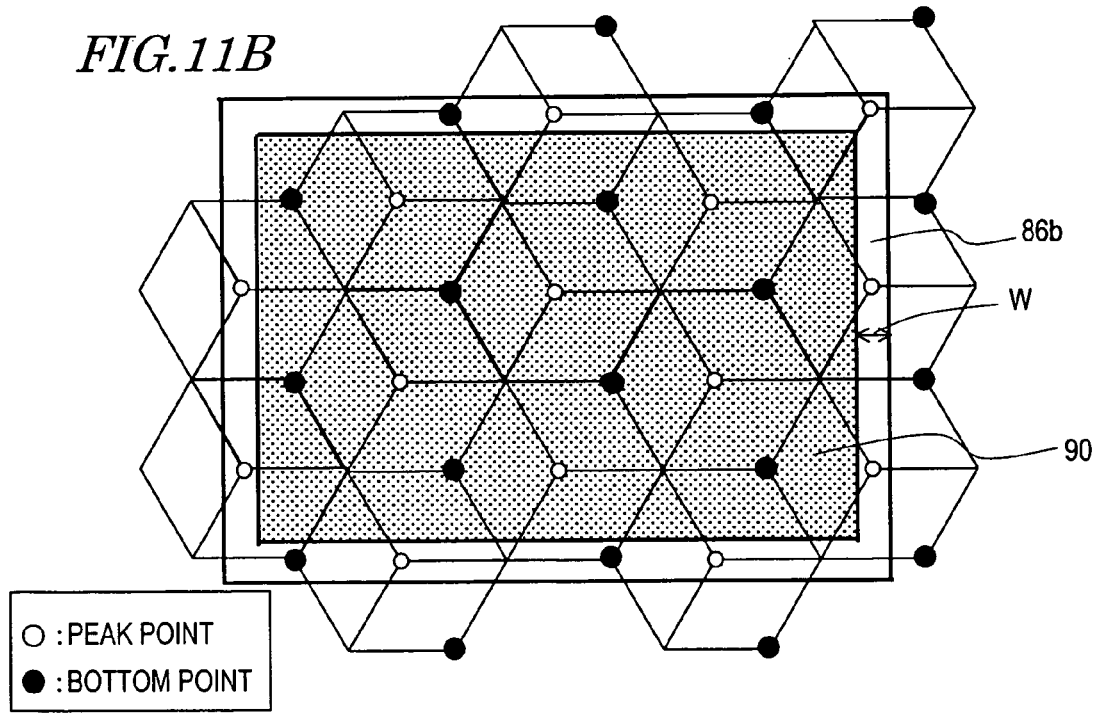

In the present embodiment, to say that "a projection 86 is disposed in peak portions" means that a wall-like projection 86 is disposed in the peak portions of the corner cubes, which does not preclude that the wall-like projection 86 is also disposed above saddle points and/or in bottom portions, as well as in peak portions. FIGS. 11A and 11B are plan views each explaining a preferable arrangement of a wall-like projection defining a pixel region 90. FIG. 11A illustrates a projection 86a which appears (in a plan view) to be formed along lines connecting the peak points of the corner cubes. In this case, a high retroreflectance can be obtained because the projection 86 is not disposed in any bottom portions of the corner cubes. FIG. 11B illustrates a projection 86b which is disposed not only above peak portions but also above bottom portions and saddle points. However, since the number of bottom portions whose shape is affected by the projection 86b is smaller than the number of peak portions whose shape is affected by the projection 86b, deterioration in the retroreflectance is suppressed. In either example, the width W of the projection 86a or 86b is preferably less than the pitch $P_{cc}$ of the corner cubes, and more preferably 50% or less of the pitch $P_{cc}$.

In the present specification, to say that "a projection 86 surrounds a pixel" means not only the case where the projection 86 constitutes one continuous wall surrounding the pixel, but also the case where the projection 86 comprises a plurality of walls which are spaced apart but still define a pixel.

As in any other embodiments described above, the reflection-type display device of the present embodiment comprises the corner cube array 80 in which openings 88 and/or projections 86 are disposed in the peak portions of the corner cubes, whereby the retroreflection characteristics of the corner cube array 80 can be improved. Moreover, according to the present embodiment, the surface (having protrusions and depressions) of the corner cube array 80 is planarized by the pixel electrodes 89, so that the liquid crystal layer 34 has a generally flat surface facing the rear substrate. Therefore, good liquid crystal orientations can be realized also near the surface of the rear substrate. Moreover, since the projections 86 serving as spacers are disposed in between pixels, any decrease in the aperture ratio associated with spacers being provided within pixels can be suppressed.

The corner cube array 80 and the pixel electrodes 89 of the present embodiment can be formed by the following method, for example.

Figure 12A:
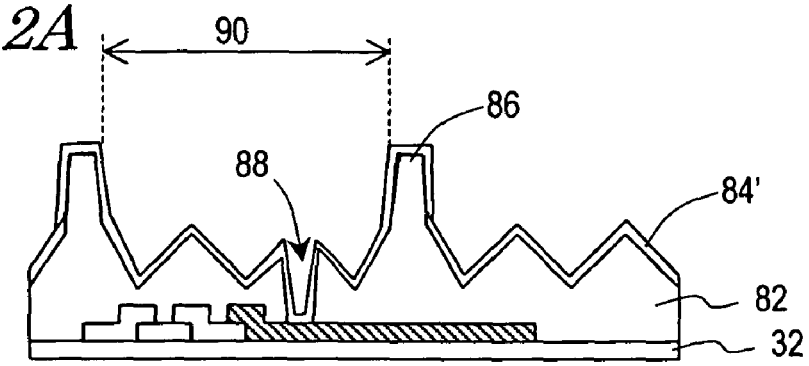
FIGS. 12A to 12D are step-by-step cross-sectional views for explaining a method for forming a corner cube array and pixel electrodes according to the third embodiment.

First, as shown in FIG. 12A, after the insulating layer 82 is formed on the rear substrate 32, a metal layer 84' is formed so as to cover the insulating layer 82. The insulating layer 82 can be formed by a method similar to the transfer-based method which has been described with reference to FIGS. 7A to 7E, except that it is necessary to employ a template having protrusions and depressions which correspond to the above-described surface configuration of the insulating layer 82. The resultant insulating layer 82 has wall-like projections 86 and openings 88 which are in the peak portions. Each moat-like region of the insulating layer 82 that is surrounded by a projection 86 becomes a pixel region 90 of the display device. The metal layer 84' can be formed by sputtering technique, vapor deposition technique, or the like.

Figure 12B:
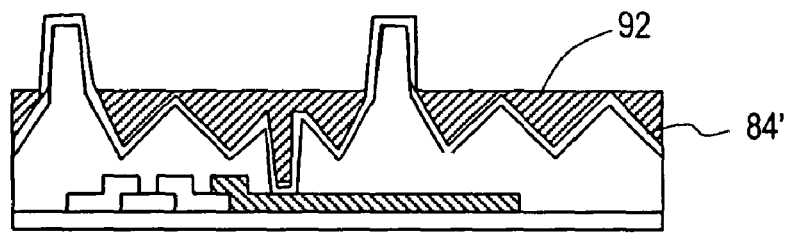

Next, as shown in FIG. 12B, a resist layer 92 is formed on the metal layer 84' by applying a resin material having photosensitivity thereto, using a coating apparatus such as a spin coater, a die coater, or a cap coater. The condition for applying the resin material is adjusted so that the thickness of the resist layer 92 is less than the height of the projection 86, thus allowing a portion of each projection 86 to be exposed above the resist layer 92.

Figure 12C:
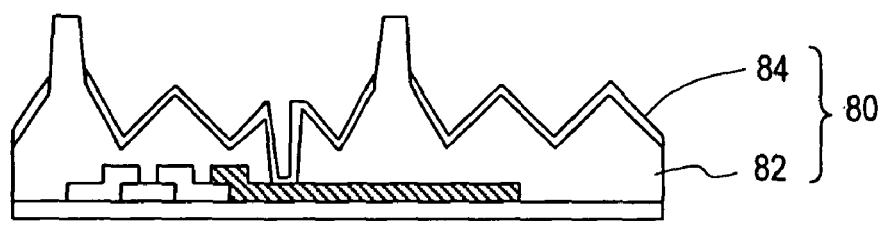

Next, as shown in FIG. 12C, the exposed portions of the metal layer 84' above the resist layer 92 are removed, and thereafter the resist layer 92 is removed, whereby a metal layer 84 which is split apart corresponding to the pixels is obtained. The exposed portion of the metal layers 84' can be removed by immersing the rear substrate 32 having the resist layer 92 formed thereon in an etchant for a desired period (wet etching). The exposed portion of the metal layer 84' may also be removed by any other method. Thus, the corner cube array 80 to serve as a retroreflective layer is formed.

Figure 12D:
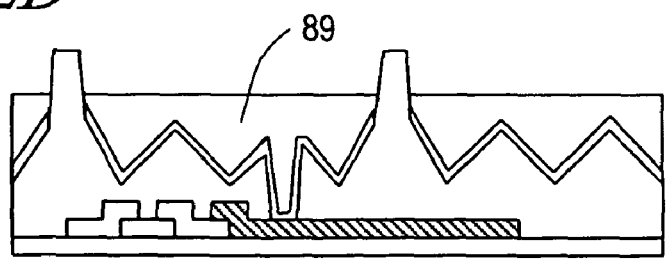

Thereafter, as shown in FIG. 12D, a pixel electrode 89 is formed in each pixel region 90 which is surrounded by a projection 86. The pixel electrodes 89 can be formed by applying a conductive liquid which contains microparticles having electrical conductivity to the pixel regions 90, followed by baking. The resultant pixel electrodes 89 each have a substantially planar surface, and function as a planarization layer which planarizes the surface (having protrusions and depressions) of the metal layer 84. Moreover, each pixel electrode 89 is in contact with a portion of the metal layer 84 that is provided in that pixel region 90, the partial metal layer 84 being connected to a corresponding switching element via a contact hole 88.

Although there is no limitation as to the method for applying a conductive liquid, a coating apparatus such as a spin coater, a die coater, or cap coater can be employed. Alternatively, an ink-jet apparatus or a dispenser may be used. As the aforementioned conductive liquid, an ITO solution compose of indium oxide and tin oxide (in which the conductive microparticles have a primary particle size of several tens of nm and a secondary particle size of several hundreds of nm) or the like may be used. Note that, when applying the conductive liquid, the applying condition must be adjusted so that the applied conductive liquid has a thickness which is smaller than the height of the projections 86, thus exposing a portion of each projection 86 above the conductive liquid.

In the above method, each projection 86 is preferably one continuous wall surround a pixel region 90, but may alternatively comprise a plurality of walls (protrusions) which are spaced apart but still define a pixel region 90. However, the spacing between such a plurality of walls must be kept small enough so that the conductive liquid will not flow out of the pixel region 90 during application of the conductive liquid.

The method which has been described with reference to FIGS. 12A to 12D has the following advantages over conventional methods.

Conventionally, the planarization layer and the pixel electrodes were formed in separate steps. Specifically, it was necessary to, after forming a planarization layer on a retroreflective layer having a corner cube array configuration, form contact holes in a planarization layer by using photolithography, and further perform photolithography and etching processes to form the pixel electrodes. In contrast, according to the method described above, the projections 86 serving as partitioning walls between pixels are formed in advance and thereafter a conductive liquid is used to form the pixel electrodes 89, thus leading to an advantage in that the corner cube array configuration can be planarized without having to employ a photolithography or etching process, and that the pixel electrodes 89 which are spaced apart corresponding to pixels can be formed. Thus, patterning of the metal layer 84', planarization of the metal layer 84, and formation of the pixel electrodes 90 can be performed by a method which is simpler and less expensive than conventional methods, without having to perform any patterning steps using photolithography.

Note that, the structure of the reflection-type display device of the present embodiment is not limited to the structure shown in FIG. 10. The reflection-type display device of the present embodiment may alternatively have a planarization layer which is formed on the corner cube array 80 having projections 86 which define the pixel regions 90, and pixel electrodes provided on such a planarization layer. In this case, the planarization layer and the pixel electrodes are formed by the following method, for example.

Figure 13A:
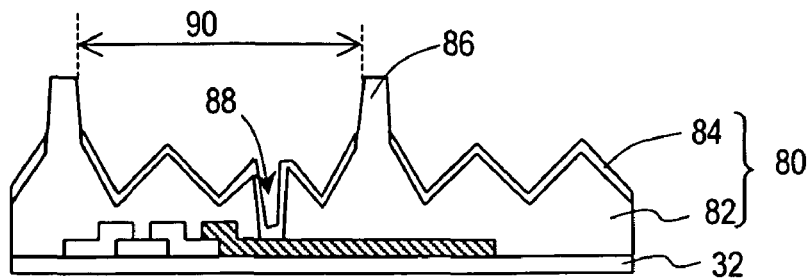
FIGS. 13A to 13E are step-by-step cross-sectional views for explaining another method for forming a corner cube array and pixel electrodes according to the third embodiment.

First, by a method similar to that which has been described with reference to FIGS. 12A to 12C, the corner cube array 80 (FIG. 13A) is formed. The corner cube array 80 includes: projections 86 each defining a pixel region 90 and functioning as a spacer; a metal layer 84 which is split apart corresponding to the pixels; and openings 88 for connecting the respective partial metal layers 84 to corresponding switching elements. The openings 88 and the projections 86 are both disposed in the peak portions of the corner cubes.

Figure 13B:
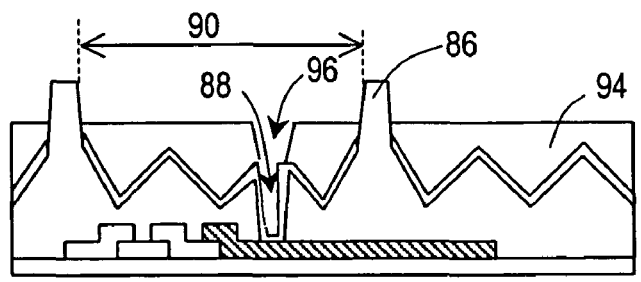

Next, as shown in FIG. 13B, a planarization resin layer 94 is formed on the corner cube array 80. Specifically, after a resin layer is formed by applying a transparent resin material having photosensitivity to the respective pixel regions 90 defined by the projections 86 of the corner cube array 80, contact holes 96 are formed in the resin layer by using photolithography. At this time, the condition for applying the resin material is adjusted so that the thickness of the planarization resin layer 94 does not exceed the height of the projection 86, thus allowing a portion of each projection 86 to be exposed above the planarization resin layer 94. The contact holes 96 are preferably aligned with respect to the openings 88 in the corner cube array 80 so that their positions coincide; however, it is not necessary for the positions of the contact holes 96 and the openings 88 to coincide.

Figure 13C:
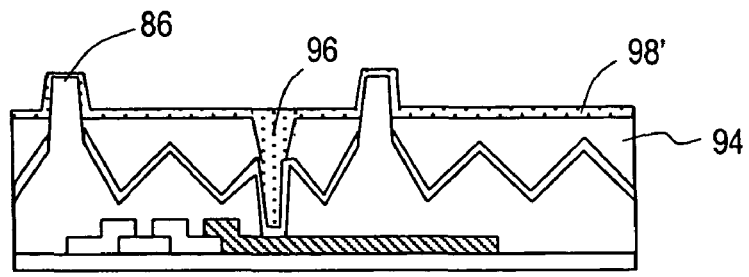

Thereafter, as shown in FIG. 13C, a conductive layer 98' is formed on the planarization resin layer 94 and the exposed portions of the projections 86, and in the contact holes 96. The conductive layer 98' can be formed by sputtering technique, using a transparent conductive material.

Figure 13D:
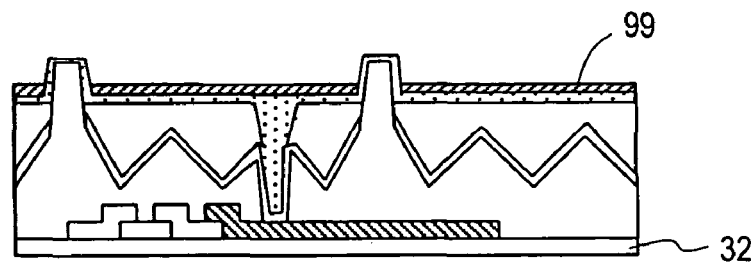

After the conductive layer 98' is formed, as shown in FIG. 13D, a resist layer 99 is formed so as to correspond to the respective pixel regions 90. The resist layer 99 can be formed by applying a resin material having photosensitivity onto the conductive layer 98', using a coating apparatus such as a spin coater, a die coater, or a cap coater. The condition for applying the resin material must be adjusted so that the thickness of the resist layer 99 is smaller than the height of the projections 86.

Figure 13E:
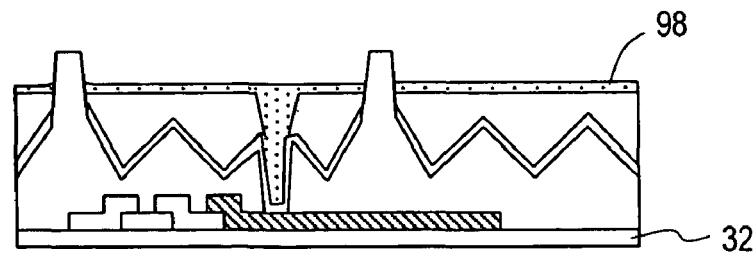

Next, the substrate 32 having the resist layer 99 formed thereon is immersed in an etchant for a desired period, thus removing the exposed portions of the conductive layer 98' above the resist layer 99 (wet etching), and further the resist layer 99 is removed from the substrate 32. As a result, as shown in FIG. 13E, pixel electrodes 98 which are spaced apart corresponding to the pixels can be formed on the planarization resin layer 94. Note that the removal of the exposed portions of the conductive layer 89' may be performed by any method other than wet etching.

According to the above-described method, after the corner cube array 80 having projections 86 defining the pixel regions 90 is formed, the planarization layer 94 and the pixel electrodes 98 are sequentially formed. As a result, the photolithography process for patterning the planarization layer 94 and the pixel electrodes 98 can be curtailed relative to conventional methods.

The corner cube array 80 of the present embodiment is characterized in that the projections 86 and/or the openings 88 are disposed in the peak portions. However, in order to more effectively suppress deterioration in the retroreflectance of the metal layer 84, it would be advantageous for both the projections 86 and the openings 88 to be disposed in the peak portions, as shown in FIG. 10, FIGS. 12A to 12C, and FIGS. 13A to 13E.

According to the present invention, in a reflection-type display device which comprises a corner cube array as a retroreflective layer, deterioration in the retroreflection characteristics of the corner cube array due to formation of spacers and contact holes can be suppressed, and an improved display contrast can be obtained. Moreover, the spacer size can be made smaller than conventionally, whereby the aperture ratio is improved.

Furthermore, according to the present invention, such a reflection-type display device can be easily produced without requiring complicated steps.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) on Patent Application No. 2005-060493 filed in Japan on Mar. 4, 2005, the entire contents of which are hereby incorporated by reference.

What is claimed is:

1. A reflection-type display device comprising:
an optical modulation layer;
a pair of substrates between which the optical modulation layer is retained;
an electrode structure for causing pixel-by-pixel changes in optical characteristics of the optical modulation layer, wherein,
one of the pair of substrates has a corner cube array comprised of a plurality of corner cubes; and
the corner cube array has a plurality of projections defining an interval between the pair of substrates, the plurality of projections being disposed in peak portions, and wherein said projections are continuous with and made of the same insulating material as a jagged structure of the corner cube array and extend upward from the jagged structure of the corner cube array through a conductive layer toward the other substrate, so that the projections are formed with the jagged structure.

2. The reflection-type display device of claim 1, wherein the corner cube array has a plurality of openings penetrating through the corner cube array, the plurality of openings being disposed in peak portions.

3. The reflection-type display device of claim 2, wherein a side wall of each of the plurality of openings has a tilt angle greater than 90°.

4. The reflection-type display device of claim 1, further comprising a metal layer formed on the corner cube array, the metal layer having a surface configuration which is defined by the corner cube array.

5. The reflection-type display device of claim 4, wherein the metal layer includes a plurality of reflection electrodes which are spaced apart corresponding to pixels.

6. The reflection-type display device of claim 5, wherein,
the one substrate further has a plurality of switching elements disposed on a rear face of the corner cube array; and
each of the plurality of switching elements is connected to a corresponding one of the reflection electrodes via a corresponding one of the openings.

7. The reflection-type display device of claim 1, wherein each of the plurality of projections is disposed between adjoining pixels.

8. The reflection-type display device of claim 7, wherein each of the plurality of projections constitutes a wall surrounding a corresponding pixel.

9. The reflection-type display device of claim 1, wherein a side wall of each of the plurality of projections has a tilt angle less than 90°.

10. The reflection-type display device of claim 1, wherein each corner cube of the corner cube array is composed of three generally-square faces which are perpendicular to one another.

11. The reflection-type display device of claim 1, wherein the plurality of corner cubes are arrayed with a pitch which is equal to or greater than a wavelength of visible light and is equal to or less than a width of each pixel.

12. A reflection-type display device comprising:
an optical modulation layer;
a pair of substrates between which the optical modulation layer is retained;
an electrode structure for causing pixel-by-pixel changes in optical characteristics of the optical modulation layer, wherein,
one of the pair of substrates has a corner cube array composed of a plurality of corner cubes;
the corner cube array has a plurality of openings penetrating through the corner cube array, the plurality of openings being disposed in peak portions; and
wherein the corner cube array has a plurality of projections defining an interval between the pair of substrates, and wherein said projections are continuous with and made of the same insulating material as a jagged structure of the corner cube array and extend upward from the jagged structure of the corner cube array through a conductive layer toward the other substrate, so that the projections are formed with the jagged structure.

13. A method for producing a reflection-type display device which includes: an optical modulation layer; a pair of substrates between which the optical modulation layer is retained; an electrode structure for causing pixel-by-pixel changes in optical characteristics of the optical modulation layer, wherein, one of the pair of substrates has a corner cube array comprising a plurality of corner cubes, the method comprising:
a step of providing a template having protrusions and depressions on a surface thereof;
a step of providing a substrate; and a step of forming on the substrate a transfer layer having a surface which corresponds to the protrusions and depressions of the template, wherein, the protrusions and depressions of the template define the shape of a corner cube array which has a plurality of projections defining an interval between the pair of substrates, the plurality of projections being disposed in peak portions, and wherein said projections are continuous with and made of the same insulating material as a jagged structure of the corner cube array and extend upward from the jagged structure of the corner cube array through a conductive layer toward the other substrate, so that the projections are formed with the jagged structure.

14. The method of claim 13, wherein the protrusions and depressions of the template define the shape of a corner cube array which has a plurality of openings as well as the plurality of projections, the plurality of openings penetrating through the corner cube array.

15. The method of claim 14, wherein the protrusions and depressions of the template define the shape of a corner cube array in which the plurality of projections and the plurality of openings are disposed in peak portions.

16. The method of claim 13, wherein, each of the plurality of projections surrounds a region defining a pixel; and the method further comprises, after the step of forming the transfer layer, a step of forming a pixel electrode in each region defining a pixel.

17. A method for producing a reflection-type display device which includes: an optical modulation layer; a pair of substrates between which the optical modulation layer is retained; an electrode structure for causing pixel-by-pixel changes in optical characteristics of the optical modulation layer, wherein, one of the pair of substrates has a corner cube array comprised of a plurality of corner cubes, the method comprising:

a step of providing a template having protrusions and depressions on a surface thereof;

a step of providing a substrate; and a step of forming on the substrate a transfer layer having a surface which corresponds to the protrusions and depressions of the template, wherein, the protrusions and depressions of the template define the shape of a corner cube array which has a plurality of openings penetrating through the corner cube array, the plurality of openings being disposed in peak portions; and wherein the protrusions and depressions of the template define the shape of a corner cube array which has a plurality of projections as well as the plurality of openings, the plurality of projections defining an interval between the pair of substrates, and wherein said projections are continuous with and made of the same insulating material as a jagged structure of the corner cube array and extend upward from the jagged structure of the corner cube array through a conductive layer toward the other substrate, so that the projections are formed with the jagged structure.

18. A mold comprising a corner cube array having a surface including protrusions and depressions which correspond to a surface configuration of the corner cube array having a plurality of corner cubes, comprising:

a plurality of projections of the mold each provided in a bottom portion of the corner cube array;

a plurality of non-penetrating holes each provided in a bottom portion of the corner cube array, and wherein the plurality of projections are higher than a peak portion of the corner cube array, and the plurality of non-penetrating holes are deeper than the bottom portion of the corner cube array.

* * * * *